Figure 1:
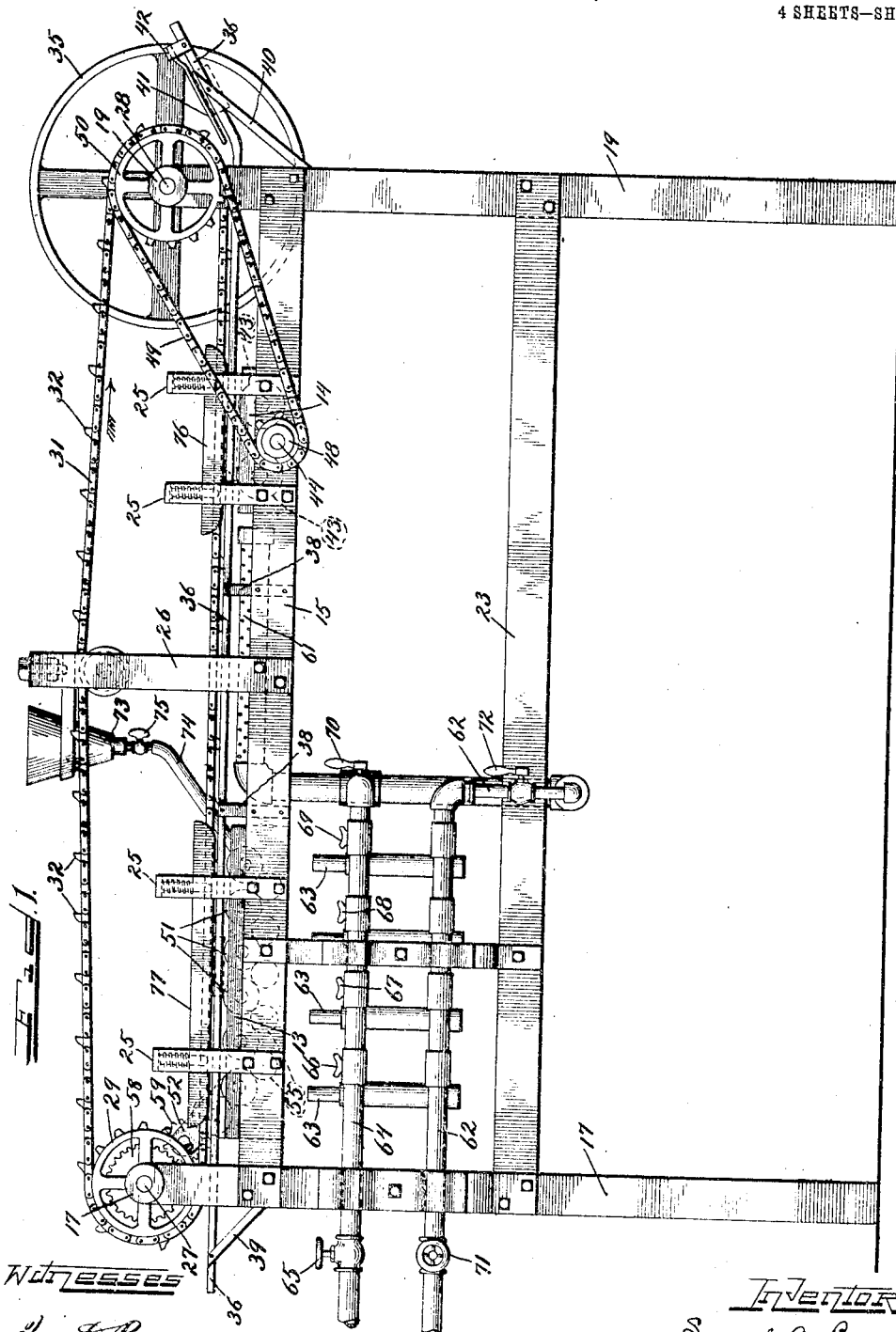

S. A. BAKER.
MACHINE FOR APPLYING SOLDER TO SHEET METAL.
APPLICATION FILED APR. 29, 1901.

906,603.

Patented Dec. 15, 1908.
4 SHEETS—SHEET 1.

S. A. BAKER.
MACHINE FOR APPLYING SOLDER TO SHEET METAL.
APPLICATION FILED APR. 29, 1901.

906,603.

Patented Dec. 15, 1908.

4 SHEETS—SHEET 2.

Witnesses
Ira D. Perry
A. L. Romme.

Inventor
Samuel A. Baker.
By Bond Adams Pickard Jackson
his Attys

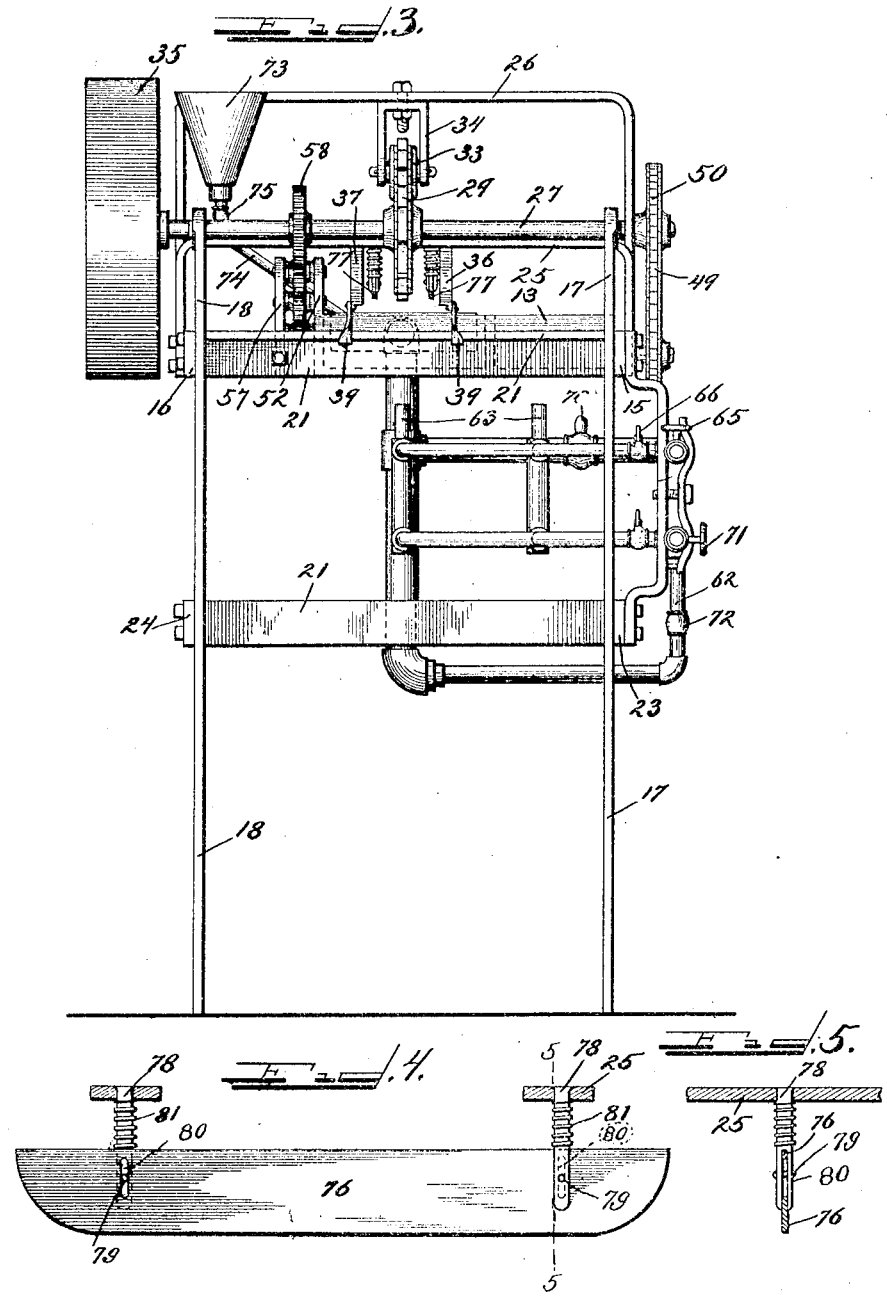

S. A. BAKER.
MACHINE FOR APPLYING SOLDER TO SHEET METAL.
APPLICATION FILED APR. 29, 1901.
No. 906,603.
Patented Dec. 15, 1908.
4 SHEETS—SHEET 4.
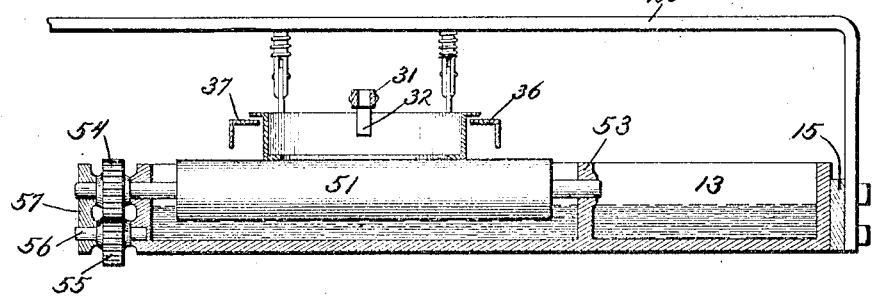
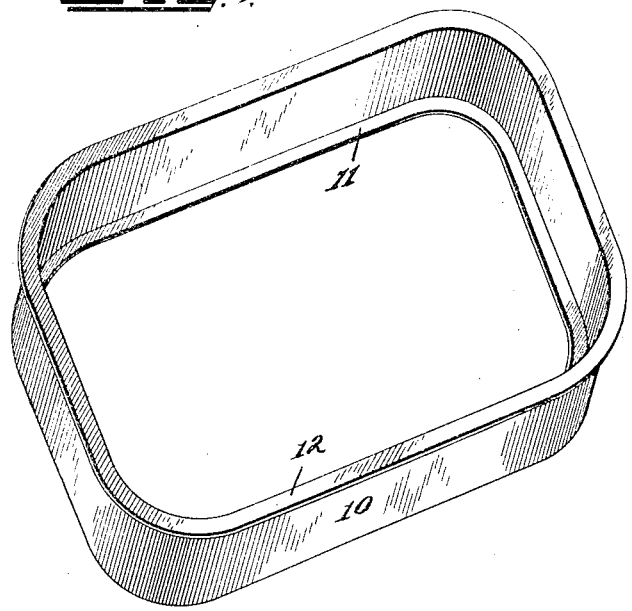
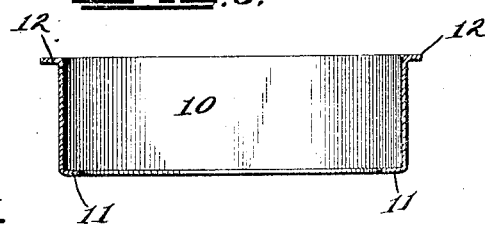
Witnesses
Ira D. Perry
A. L. Romme.
Inventor
Samuel A. Baker,
by Bond Adams Pickard & Jackson
his Att'ys

UNITED STATES PATENT OFFICE.

SAMUEL A. BAKER, OF EASTPORT, MAINE, ASSIGNOR, BY MESNE ASSIGNMENTS, TO AMERICAN KEY CAN COMPANY, OF CHICAGO, ILLINOIS, A CORPORATION OF NEW JERSEY.

MACHINE FOR APPLYING SOLDER TO SHEET METAL.

No. 906,603.  Specification of Letters Patent.  Patented Dec. 15, 1908.

Application filed April 29, 1901. Serial No. 57,990.

*To all whom it may concern:*

Be it known that I, SAMUEL A. BAKER, a citizen of the United States, residing at Eastport, in the county of Washington and State of Maine, have invented certain new and useful Improvements in Machines for Applying Solder to Sheet Metal, of which the following is a specification, reference being had to the accompanying drawings.

My invention relates to machines for applying solder to articles of sheet-metal, such as can-bodies, as a step in the manufacture of tin cans, and has for its object to provide an apparatus by the operation of which the can-bodies may be prepared to receive tops or bottoms, as the case may be, in the subsequent steps of the process of manufacture. While this is the primary object of my invention, I wish it to be understood that my improved machine may be used for any other purpose to which it is adapted; and it should also be understood that, while I have shown and described it as used in connection with sardine cans, it is also adapted for treating cans of other shapes, as well as for applying solder to sheet-metal whether in the form of can-bodies or not.

My invention, generally stated, consists in providing a carrier adapted to conduct the can-bodies during the process of treatment, in combination with means for heating the surfaces to which the solder is to be applied, and means for subsequently applying molten solder to the heated surfaces.

It consists, further, in an apparatus involving the features last above specified, in connection with apparatus for applying a suitable flux to the parts to which the solder is to be applied, prior to the heating thereof.

My invention also consists in providing suitable devices for applying molten solder, in combination with carrier-mechanism arranged to support the cans to be soldered with the lower portions thereof projecting downward, so that as they are carried by the solder-applying devices their lower surfaces receive an application of molten solder; and, as a further improvement, my invention consists in suspending the cans as they are carried along, so that they may readily accommodate themselves to the solder-applying devices, so as to insure the proper application of the solder thereto.

It also consists in certain other details of construction which will be hereinafter more specifically pointed out.

That which I regard as new will be set forth in the claims.

Figure 2:
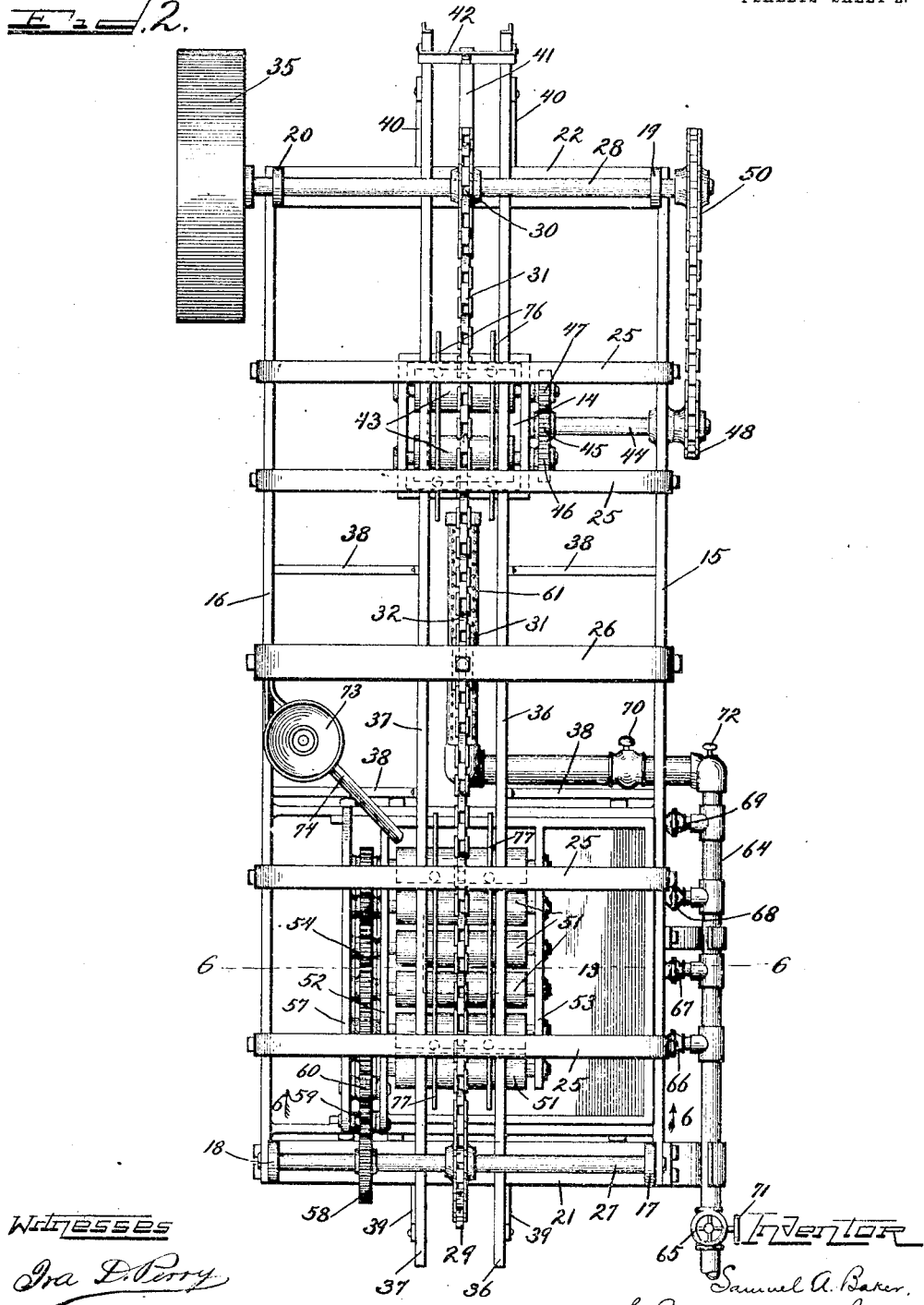

In the accompanying drawings,—Figure 1 is a side elevation of my improved machine; Fig. 2 is a plan view; Fig. 3 is an end view looking to the right of the machine as shown in Fig. 1; Fig. 4 is a partial longitudinal vertical section showing one of the presser bars; Fig. 5 is a cross section on line 5—5 of Fig. 4; Fig. 6 is a cross section of the machine on line 6—6 of Fig. 2; Fig. 7 is a perspective view of one of the can-bodies; and Fig. 8 is a cross section thereof.

Referring to the drawings,—it will be noted from an inspection of Figs. 7 and 8, that the can-body illustrated consists of a body portion 10 having at one edge an inwardly-projecting flange 11 and at the other edge an outwardly-projecting flange 12. In the drawings, the machine is illustrated as operating to apply a coating of solder to the outer surface of the inwardly-projecting flange 11, the object being to prepare the can-body to receive the part termed the top of the can, by a process of my invention which will form the subject-matter of a separate application for patent. While such process is not a part of my present invention, I would say, in order that the operation of my improved machine may be clearly understood, that such process consists in manufacturing cans by applying solder to a flange carried by the body of the can, afterwards placing the top or bottom, as the case may be, in contact with the solder-coated surface of the flange, and then heating the flange at the point of contact sufficiently to sweat or melt the solder, thereby soldering the top to the flange. The exteranl flange 12, illustrated in Figs. 7 and 8, is employed, in the machine which forms the subject-matter of this application, to suspend the can-body as it passes through the machine, and the most approved form of my machine is arranged to suspend the can-bodies by means of such a flange or the equivalent thereof, as will be hereinafter set forth; but I wish to state here that my invention is not restricted to structures for use only with can-bodies provided with an externally-projecting flange, as 12, or equivalent devices therefor, except in so far as concerns the claims of which mechanism for suspending the can is a feature.

The general construction of the machine is best illustrated in Figs. 1 and 2, from an inspection of which it will be seen that there are two baths 13 and 14, which are respectively solder and flux baths, the solder-bath 13 being supported near one end of the machine-frame and the flux-bath 14 near the opposite end thereof. The baths are supported on side bars 15—16 carried on corner posts 17—18—19—20. Cross braces 21—22 are provided at the ends of the machine for holding the corner posts apart, and, preferably, additional side pieces 23—24 are provided, which are placed below the side pieces 15—16, thereby strengthening the frame. In addition, a number of U-shaped cross-braces 25 are provided, which are secured to the side pieces 15—16, extending up over the baths, as shown in the drawings. 26 indicates a somewhat larger cross brace, which is also U-shaped and secured similarly to the braces 25, but extends up higher than said braces, as shown in Fig. 3. 27—28 indicate shafts mounted in the upper ends of the corner posts, the shaft 27 being supported by the posts 17—18, while the shaft 28 is supported by the posts 19—20, so that said shafts extend transversely of the machine. The shaft 27 carries a sprocket wheel 29, and the shaft 28 carries a sprocket wheel 30, both the sprocket wheels being arranged substantially centrally to their respective shafts and in substantially the same vertical plane. 31 indicates a link belt, which is mounted on said sprocket wheels and is provided with a number of outwardly-projecting lugs 32, said link-belt, together with the rails hereinafter referred to forming a carrier for the cans, as will be hereinafter described. At about the longitudinal center of the machine, the belt 31 is supported by an idler 33 carried in a yoke 34 depending from the brace 26, as shown in Fig. 3. The sprocket wheels 29—30 are so placed with reference to the baths 13—14 that the lower portion of the link belt or carrier 31 lies adjacent to and over said baths. 35 indicates a pulley mounted on the shaft 28, for driving said shaft. 36—37 indicate parallel rails arranged longitudinally of the machine and projecting a short distance beyond each end thereof. Said rails, as shown in Figs. 2 and 6, lie at opposite sides of the carrier 31, and are adapted to suspend the can-bodies to be treated. They are preferably formed of angle irons, and are supported by braces 38 secured to the side bars 15—16, and by end braces 39—40 secured to the cross bars 21—22, respectively.

As shown in Fig. 6, the space between the rails 36—37 is just sufficient for the passage of the can-body, the outwardly-projecting flange of which extends over the rails, as shown, so that said flange ordinarily rests on said rails as the can-body is moved along by the carrier 31. The can-bodies are thus suspended from the rails so that they are free to rise and fall independently of the rails.

41 indicates a spring plate, which is secured at its outer end to a cross bar 42 which connects the ends of the rails 36—37 at the inlet end of the machine, which is shown at the top in Fig. 2. Said spring plate projects downward and inward, and lies slightly above the rails 36—37, whose function is to prevent the can-bodies from being displaced as they enter the machine. When the cans are fed to the machine their flanges 12 are placed on the outer ends of the rails 36—37 by the operator, and they then slide down under the plate 41 until they are taken by the lugs 32 of the carrier and conducted through the machine.

43 indicates rollers mounted in the flux-bath 14 and extending transversely thereof, their ends being mounted in suitable bearings so that they are free to rotate in the bath. The rollers 43 are so placed that their lower surfaces are partly immersed in the flux while their upper surfaces engage the lower surface of the flange 11 of the can-body as it is carried along by the carrier. Said rollers, which may be one or more in number, are rotated so that their upper surfaces move in the same direction as the cans, by means of a shaft 44 mounted at its outer end in the frame of the machine and at its inner end in a suitable bearing in the flux-bath frame, as best shown in Fig. 2, said shaft carrying a pinion 45 which meshes with pinions 46—47 carried, respectively, by the rollers 43. Said shaft 44 carries at its outer end a sprocket wheel 48, which is connected by a chain 49 with a sprocket wheel 50 mounted on the shaft 28. By this construction, when the shaft 28 is rotated, the lower portion of the carrier chain 31 will move in the same direction as the upper surfaces of the rollers 43.

51 indicates rollers, one or more of which may be used, which are mounted in suitable bearings in the solder-bath 13. Said rollers are arranged in parallelism and extend transversely of the solder-bath under the carrier chain 31, as shown in Fig. 2. For the purpose of supporting said rollers, longitudinally-extending bars 52—53 are best provided, as shown. Said rollers are arranged similarly to the rollers 43,—that is to say, their lower portions extend into the solder-bath while their upper surfaces are adapted to contact with the lower surface of the flange 11 of the can-body. Each of said rollers is provided with a pinion 54, as shown in Fig. 2. Said pinions are connected together through intermediate gears 55 mounted on studs 56 secured between the bars 52 and bars 57, as shown in Figs. 2 and 6. The intermediate pinions 55 are arranged below and between adjacent pinions 54, as indicated by dotted lines in Fig. 1, and in substantially the same way as the pinion 48, so that the rollers 51 are all rotated in the same direction and their upper surfaces move in the same direction as the carrier 31. Said pinions are all driven from the shaft 27 by means of a gear 58, which is geared thereto by intermediate pinions 59—60, as shown in Fig. 2.

The can-bodies are heated before reaching the solder-bath by means of a heater 61 arranged below and adjacent to the carrier 31, as shown in Fig. 2. Said heater, in the construction shown, consists of a gas burner which receives gas from a gas pipe 62 and air from an air pipe 64, as shown in Figs. 1 and 2. The solder in the solder-bath is kept in a molten condition by means of a series of burners 63, of the Bunsen type, arranged thereunder and receiving gas from the pipe 62 and air from the pipe 64. Said gas and air pipes are provided with suitable valves, so that the supply of gas and air may be controlled. The air pipe 64 is provided with a main valve 65, by which the air may be cut off from all the burners, and with supplemental valves 66—67—68—69, by which the admission of air to the different burners 63 may be regulated. It also is provided with a valve 70, by which the supply of air to the burner 61 may be regulated. The gas pipe 62 is also provided with a main valve 71 and with an auxiliary valve 72, by which the gas supplied to the burner 61 may be regulated.

73 indicates an oil reservoir which communicates, by a pipe 74 provided with a cock 75, with the solder-bath, the object being to supply oil to the solder-bath to prevent oxidation of the solder. The oil forms a coating on the surface of the molten solder, and as the rollers extend through the oil coating, the solder taken up by them is clean and free from dross.

In order to movably hold the cans down properly in contact with the rollers by which the flux and the solder are applied, presser bars 76—77, respectively, are provided, two presser bars 76 being provided over the flux-bath and two presser bars 77 over the solder-bath, one at each side of the carrier, as shown in Figs. 1, 2 and 3. The construction of the presser bars is best shown in Figs. 4 and 5, from which it will be seen that each of the bars is rounded at its ends and is supported in a vertical slot in the lower end of a bar 78 depending from one of the cross braces 25, as shown in Figs. 1, 2 and 4. The presser bars are prevented from becoming displaced by pins 79, which are carried in the bars 78 and extend through slots 80 in the presser bars, as shown in Fig. 4. Springs 81 on the bars 78 serve to hold the presser bars 76 movably down upon the upper surfaces of the can-bodies, as shown in Fig. 6.

The operation of my improved apparatus is as follows: Can-bodies enter the machine at the right, as shown in Fig. 1, being placed by the operator on the outer ends of the rails 36—37, which are bent upward, as shown in Fig. 1, the outer flanges 12 of the can-bodies resting on said rails. Gravity causes the can-bodies to slide down the inclined surfaces of the rails, under the spring 41 and below the carrier 31, which then takes them, the lugs 32 engaging the can-bodies and carrying them along through the machine. When the can-bodies reach the presser bars 76, they pass under them and are held down closely in contact with the rollers 43, by the rotation of which the flux is applied to the lower surfaces of the flanges 11. The can-bodies then pass over the burner or heater 61, where they are heated, and thence are carried to the solder-bath 13, passing under the presser bars 77. As the can-bodies are carried along over the rollers 51, the rotation of said rollers applies solder to the lower surface of the flange 11, where it cools as soon as the can-body passes beyond the solder-bath. The can-bodies are then removed and are ready for further treatment.

By carrying the cans with their lower end-portions projecting, not only is the heating of the parts to which the solder is to be applied facilitated, but the application of the solder may also be effected more quickly, smoothly, and perfectly. Inasmuch as the entire lower surfaces of the cans are exposed, the solder-applying rollers may extend from one side of the can to the other, so that, regardless of the shape of the cans, the solder may be applied at opposite sides of the lower surface at the same time. Furthermore, inasmuch as the can-bodies are held so that their lower surfaces are substantially horizontal, when the solder is applied thereto it does not flow, and when cool, there is a uniform layer of solder over the entire lower surface of the can-body.

While I have described my improved machine in detail as illustrated in the drawings, I wish it to be understood that my invention is not restricted to such specific details of construction, except in so far as they are specifically claimed.

So far as I am aware, no one has heretofore proposed to provide a machine of this class in which the can-bodies, or other articles to which the solder is to be applied, are carried along with their lower end-portions exposed, or arranged to suspend the can-bodies as they are carried through the machine; nor, prior to my invention, has it been proposed to conduct the can-bodies, meanwhile so supporting them that their lower surfaces assumed a substantially horizontal position while the solder was applied thereto.

That which I claim as my invention and desire to secure by Letters Patent is,—

1. In a machine for applying solder to the under-surface of can bodies, supporting rails between which a can body is suspended and on which it is adapted to slide, a carrier for moving the body across said rails, a solder bath, solder-applying rollers partially immersed in the solder in said bath, said rollers being arranged beneath the rails and at such a distance therefrom as to cause the can body to be lifted from the rails as it passes over the rollers, and means for exerting a downward pressure upon the can body while it is in engagement with the rollers.

2. In a machine for applying solder to the under-surfaces of can bodies, supporting rails for a can body, a carrier for moving the can body along said rails, solder-applying rollers arranged beneath said rails and at such a distance therefrom as to support the can body independently of the rails, and means for exerting a downward pressure upon the can body while supported upon said rollers.

3. In a machine for applying solder to the under-surfaces of can bodies, supporting rails for a can body, a carrier for moving such can body along said rails, solder-applying rollers arranged beneath said rails and in such relation thereto as to lift the can body and support it free of the rails, and a yielding guide for engaging with the can body and pressing it downwardly against said rollers while it is supported upon the rollers.

4. In a machine for applying solder to the under-surface of can bodies having laterally projecting shoulders, a pair of rails spaced apart sufficiently to permit a can body to be suspended between them with the shoulders resting upon the rails, solder applying rollers arranged beneath the rails at a distance below the upper surfaces of the rails less than the distance between the under-surface of the can body and the shoulders on the can body, means for moving the can body along said rails and over said rollers, and means for exerting a downward pressure upon the can body while it is passing over the rollers.

5. In a machine for applying solder to the under-surface of can bodies having laterally projecting shoulders, a pair of rails spaced apart sufficiently to permit a can body to be suspended between them with the shoulders resting upon the rails, solder-applying rollers arranged beneath the rails at a distance below the upper surfaces of the rails less than the distance between the under-surfaces of the can body and the shoulders on the can body, means for moving the can body along said rails and over said rollers, a spring-pressed guide above the rollers for engaging with the upper surfaces of the can body and pressing the can body against the rollers.

SAMUEL A. BAKER.

Witnesses:
JOHN L. JACKSON,
ALBERT H. ADAMS.